(12) United States Patent
Kim et al.

(10) Patent No.: US 8,970,682 B2
(45) Date of Patent: Mar. 3, 2015

(54) 3 DIMENSIONAL IMAGE DISPLAY DEVICE AND METHOD OF DRIVING THE SAME

(75) Inventors: Bo-Ram Kim, Asan-si (KR);
Byoung-Jun Lee, Cheonan-si (KR);
Yun-Jae Kim, Asan-si (KR); Nam-Hee Goo, Gunsan-si (KR); Myoung-Chul Kim, Dongducheon-si (KR);
Gyeong-Ub Moon, Seoul (KR);
Seung-Hwan Moon, Asan-si (KR)

(73) Assignee: Samsung Display Co., Ltd. (KR)

( * ) Notice: Subject to any disclaimer, the term of this patent is extended or adjusted under 35 U.S.C. 154(b) by 704 days.

(21) Appl. No.: 12/705,137

(22) Filed: Feb. 12, 2010

(65) Prior Publication Data
US 2011/0157332 A1 Jun. 30, 2011

(30) Foreign Application Priority Data
Dec. 24, 2009 (KR) ........................ 10-2009-0131322

(51) Int. Cl.
H04N 13/04 (2006.01)

(52) U.S. Cl.
CPC ....... *H04N 13/0454* (2013.01); *H04N 13/0438* (2013.01); *H04N 13/0497* (2013.01)
USPC ............. 348/56; 348/42; 348/46; 348/51; 348/E13.075

(58) Field of Classification Search
CPC .......... H04N 13/0285; H04N 13/0429; H04N 13/0438; H04N 13/0454
USPC ............................ 348/42, 46, 51, 56, E13.075
See application file for complete search history.

(56) References Cited

U.S. PATENT DOCUMENTS

| | | | |
|---|---|---|---|
| 4,021,846 A | 5/1977 | Roese | |
| 5,786,848 A | 7/1998 | Isobe et al. | |
| 6,348,916 B1 | 2/2002 | Jeong et al. | |
| 6,456,432 B1 | 9/2002 | Lazzaro et al. | |
| 7,180,478 B2 | 2/2007 | Hamagishi et al. | |
| 7,215,356 B2 | 5/2007 | Lin et al. | |
| 7,502,010 B2 | 3/2009 | Kirk | |
| 7,540,643 B2* | 6/2009 | Hu et al. | 362/551 |
| 7,616,172 B2 | 11/2009 | Lin et al. | |
| 7,724,211 B2* | 5/2010 | Slavenburg et al. | 345/8 |
| 2005/0046951 A1* | 3/2005 | Sugihara et al. | 359/619 |
| 2007/0008314 A1 | 1/2007 | Song et al. | |
| 2007/0091058 A1* | 4/2007 | Nam et al. | 345/102 |
| 2007/0229395 A1 | 10/2007 | Slavenburg et al. | |

(Continued)

FOREIGN PATENT DOCUMENTS

| | | |
|---|---|---|
| CN | 101371292 A | 2/2009 |
| CN | 101415126 | 4/2009 |

(Continued)

OTHER PUBLICATIONS

Extended European Search Report for Application No. 10003189.7-1905 / 2339864 dated Oct. 4, 2013.

*Primary Examiner* — Christopher S Kelley
*Assistant Examiner* — Maria Vazquez Colon
(74) *Attorney, Agent, or Firm* — Cantor Colburn LLP (57) ABSTRACT

A stereoscopic image display device includes; a display device into which left-eye image data and right-eye image data are alternately input, and a shutter member including a left-eye shutter and a right-eye shutter, wherein the left-eye shutter and the right-eye shutter are opened in at least one of at least a part of an input period for the left-eye image data and at least a part of an input period for the right-eye image data.

40 Claims, 9 Drawing Sheets

(56) References Cited

U.S. PATENT DOCUMENTS

| | | |
|---|---|---|
| 2007/0229487 A1 | 10/2007 | Slavenburg et al. |
| 2007/0242068 A1 | 10/2007 | Han et al. |
| 2008/0036696 A1 | 2/2008 | Slavenburg et al. |
| 2008/0258997 A1 | 10/2008 | Arai |
| 2009/0179850 A1* | 7/2009 | Chen et al. .................... 345/102 |
| 2010/0164922 A1* | 7/2010 | Nose et al. .................... 345/207 |

FOREIGN PATENT DOCUMENTS

| | | |
|---|---|---|
| JP | 2000275575 | 10/2000 |
| JP | 2005077437 A | 3/2005 |
| JP | 2005077472 A | 3/2005 |
| JP | 2007020179 A | 1/2007 |
| JP | 2007114793 A | 5/2007 |
| JP | 2007286623 A | 11/2007 |
| JP | 2008268396 A | 11/2008 |
| JP | 2008268397 A | 11/2008 |
| JP | 2009025436 A | 2/2009 |
| JP | 2009-531979 A | 9/2009 |
| KR | 100623726 B1 | 9/2006 |
| KR | 100728113 B1 | 6/2007 |
| KR | 1020080093876 A | 10/2008 |
| KR | 100893616 B1 | 4/2009 |
| KR | 100898287 B1 | 5/2009 |
| TW | I261099 | 9/2006 |
| WO | 2007126904 A2 | 11/2007 |
| WO | WO 2009069026 A2 * | 6/2009 |
| WO | 2009137033 A2 | 11/2009 |

* cited by examiner

FIG.9 ated by an external light source, such as a fluorescent light,
3 DIMENSIONAL IMAGE DISPLAY DEVICE AND METHOD OF DRIVING THE SAME This application claims priority to Korean Patent Application No. 10-2009-0131322, filed on Dec. 24, 2009, and all the benefits accruing therefrom under 35 U.S.C. §119, the content of which in its entirety is herein incorporated by reference.

BACKGROUND OF THE INVENTION (a) Field of the Invention
A stereoscopic image display device and a driving method thereof are provided.

(b) Description of the Related Art
Generally, in the technology area of three-dimensional image display, a stereoscopic effect for viewing an object is presented using binocular parallax. Binocular parallax is the most important factor to allow a person to perceive the stereoscopic effect at a close range. That is, different 2D images are respectively seen by a right eye and a left eye, and if the image seen by the left eye (hereinafter referred to as a "left-eye image") and the image seen by the right eye (hereinafter referred to as a "right-eye image") are transmitted to the brain, the left-eye image and the right-eye image are combined by the brain such that the brain perceives a 3D image having depth.

The typical stereoscopic image display devices using the binocular parallax effect in 3D image displays are typically categorized as stereoscopic schemes using glasses, such as a shutter glasses or polarized glasses, and autostereoscopic schemes in which a lenticular lens or a parallax barrier is disposed between a user and the display device. Autostereoscopic schemes typically operate without the use of special glasses.

In a stereoscopic image display device using the shutter glasses scheme, the left-eye image and the right-eye image are sequentially time-separated and continuously output, and the left-eye shutter and the right-eye shutter of the shutter glasses are selectively open or shut such that the left-eye image and the right-eye image are sequentially viewed by the user and a stereoscopic image is displayed.

The shutter glasses scheme may easily execute a change between a 2D mode and a 3D mode of a display device, and a loss of data in each mode may not be generated. However, the shutter glasses in which the shutter is open or shut is worn such that the luminance of the stereoscopic image display device and the surroundings thereof may be diminished, e.g., the surrounding and display appear dimmed, a flicker generated by an external light source, such as a fluorescent light, may be easily recognized, and tiredness of the eyes of a user may be serious after viewing the display device through the glasses for an extended period.

BRIEF SUMMARY OF THE INVENTION

An exemplary embodiment of a stereoscopic image display device according to the present invention includes; a display device into which left-eye image data and right-eye image data are alternately input, and a shutter member including a left-eye shutter and a right-eye shutter, wherein the left-eye shutter and the right-eye shutter are opened in at least one of at least a part of an input period for the left-eye image data and at least a part of an input period for the right-eye image data.

In one exemplary embodiment, a backlight which receives a first on pulse applied thereto may be further included, and at least a part of the first on pulse may be applied between the input period of the left-eye image data and the input period of the right-eye image data.

In one exemplary embodiment, the display device may be input with normal image data, the backlight may receive at least one second on pulse applied thereto at the input period of the normal image data, and the magnitude of the first on pulse may be larger than the magnitude of the second on pulse.

In one exemplary embodiment, the backlight may be a light emitting diode ("LED").

In one exemplary embodiment, the magnitude of the first on pulse may be equal to or larger than about 1.5 times the magnitude of the second on pulse.

In one exemplary embodiment, the second on pulse may have a duty ratio of less than about 100%.

In one exemplary embodiment, one of the left-eye shutter and the right-eye shutter may be closed and the other may be opened in at least a part of the first on pulse.

In one exemplary embodiment, the backlight may be turned on after the passage of a first time from a time when the input of the left-eye image data or the right-eye image data is completed.

In one exemplary embodiment, the left-eye shutter and the right-eye shutter may respectively further include a liquid crystal material, and the first time may be greater than the response time of the liquid crystal material of the shutter.

In one exemplary embodiment, the right-eye shutter may be closed from the time when the input of the left-eye image data is completed before the passage of the first time, and the left-eye shutter may be closed from the time when the input of the right-eye image data is completed before the passage of the first time.

In one exemplary embodiment, the backlight may be turned off from the start of the input of the left-eye image data or the right-eye image data after the passage of the second time.

In one exemplary embodiment, the display device may further include a liquid crystal material, and the second time may be shorter than the response time of the liquid crystal material of the display device.

In one exemplary embodiment, the second time may be less than about 15% of the response time of the liquid crystal material of the display device.

In one exemplary embodiment, the right-eye shutter may be opened after the passage of the second time period from the time when the input of the right-eye image data is started, and the left-eye shutter may be opened after the passage of the second time period from the time when the input of the left-eye image data is started before the passage of the second time.

In one exemplary embodiment, the right-eye shutter may be opened before the third time from the time when the input of the right-eye image data is started, and the left-eye shutter may be opened before the third time from the time when the input of the left-eye image data is started.

An exemplary embodiment of a stereoscopic image display device according to the present invention includes; a display device into which normal image data is input, and into which a left-eye image data and a right-eye image data are alternately input, a backlight which receives a first on pulse and at least one second on pulse, and a shutter member including a left-eye shutter and a right-eye shutter, wherein at least a part of the first on pulse occurs between the input period of the left-eye image data and the input period of the right-eye image data, the second on pulse occurs during the input period of the normal image data, and the magnitude of the first on pulse is larger than the magnitude of the second on pulse.

An exemplary embodiment of a method for driving a stereoscopic image display device including a display device and a shutter member having a left-eye shutter and a right-eye shutter according to the present invention includes; alternately inputting left-eye image data and right-eye image data to the display device, and opening the left-eye shutter and the right-eye shutter during at least a part of the time when the left-eye image data or the right-eye image data is being input to the display device.

At least a part of the first on pulse may be applied to the backlight between the input period of the left-eye image data and the input period of the right-eye image data.

In one exemplary embodiment, the display device may be input with normal image data, at least one second on pulse may be applied to the backlight during the input of the normal image data, and the magnitude of the first on pulse may be equal to or larger than about 1.5 times the magnitude of the second on pulse.

In one exemplary embodiment, one of the left-eye shutter and the right-eye shutter may be closed and the other may maintain the opened state during at least a portion of the first on pulse.

An exemplary embodiment of a method for driving a stereoscopic image display device including a display device and a shutter member having a left-eye shutter and a right-eye shutter according to the present invention includes; inputting normal image data to the display device and alternately inputting left-eye image data and right-eye image data to the display device, applying at least a part of the first on pulse to a backlight between the input period of the left-eye image data and the input period of the right-eye image data to a backlight, and applying at least one second on pulse to the backlight during the input of the normal image data, wherein the magnitude of the first on pulse is larger than the magnitude of the second on pulse.

According to an exemplary embodiment of the present invention, the luminance deterioration may be prevented at the stereoscopic image display device and the surrounding area thereof, the flicker by the external light source may be reduced, the tiredness of the eyes due to watching for a long time may be reduced, and the power consumption of the stereoscopic image display device may be reduced.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION OF THE EMBODIMENTS

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Now, an exemplary embodiment of a stereoscopic image display device according to the present invention will be described with reference to FIG. 1 to FIG. 9.

Figure 1:
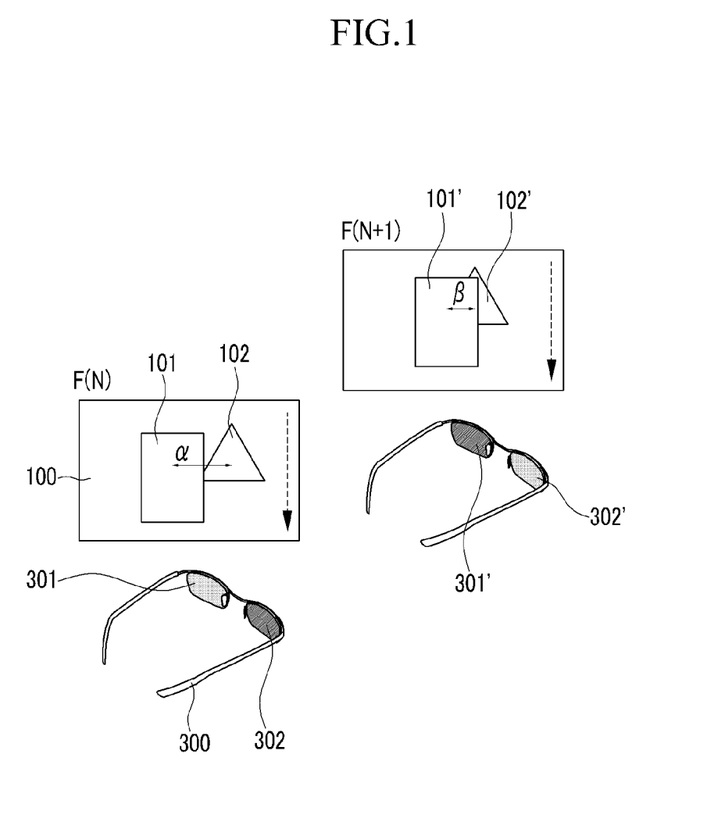
FIG. 1 is a schematic diagram showing an exemplary embodiment of an operation of an exemplary embodiment of a stereoscopic image display device according to the present invention.
Figure 6:
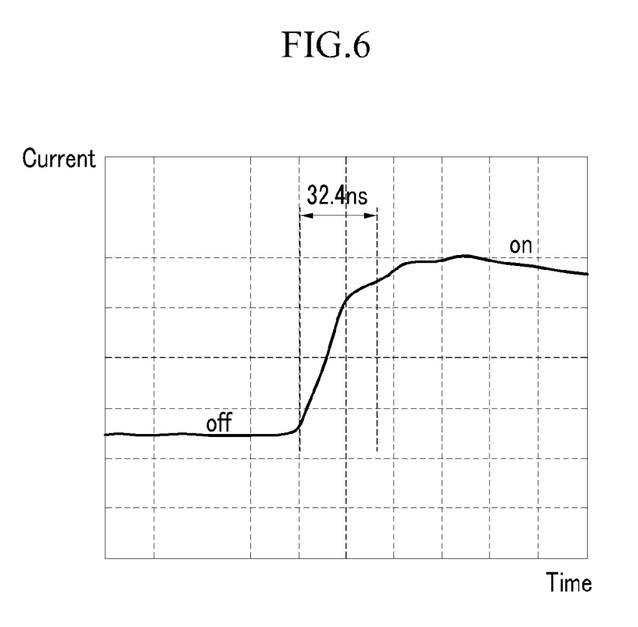
FIG. 6 and FIG. 7 are graphs showing a current characteristic of an exemplary embodiment of a light emitting diode ("LED")
Figure 7:
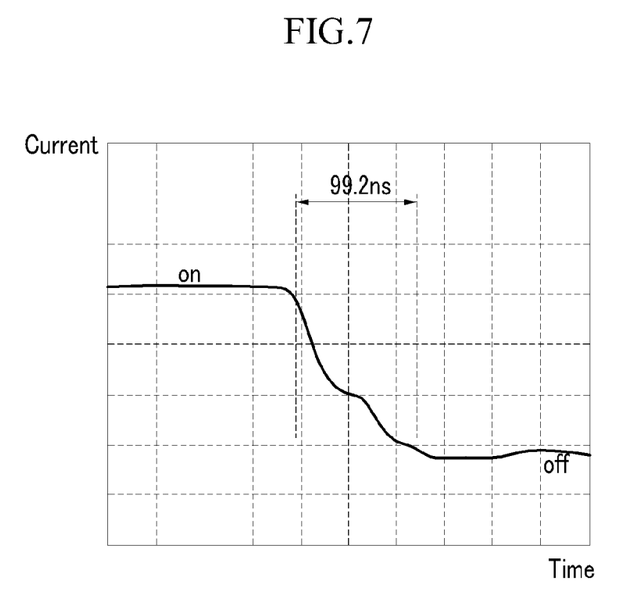
Figure 8:
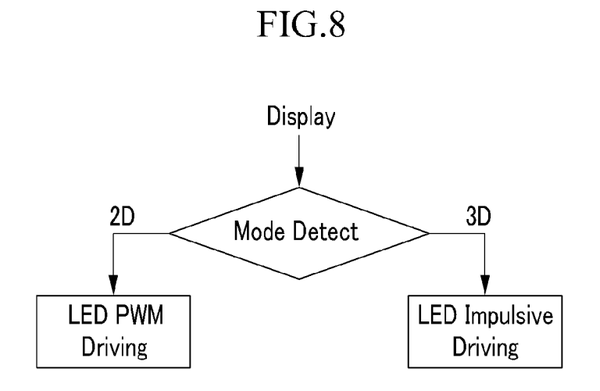
FIG. 8 is a block diagram of an exemplary embodiment of an LED driving method in a 2D mode and a 3D mode.
Figure 9:
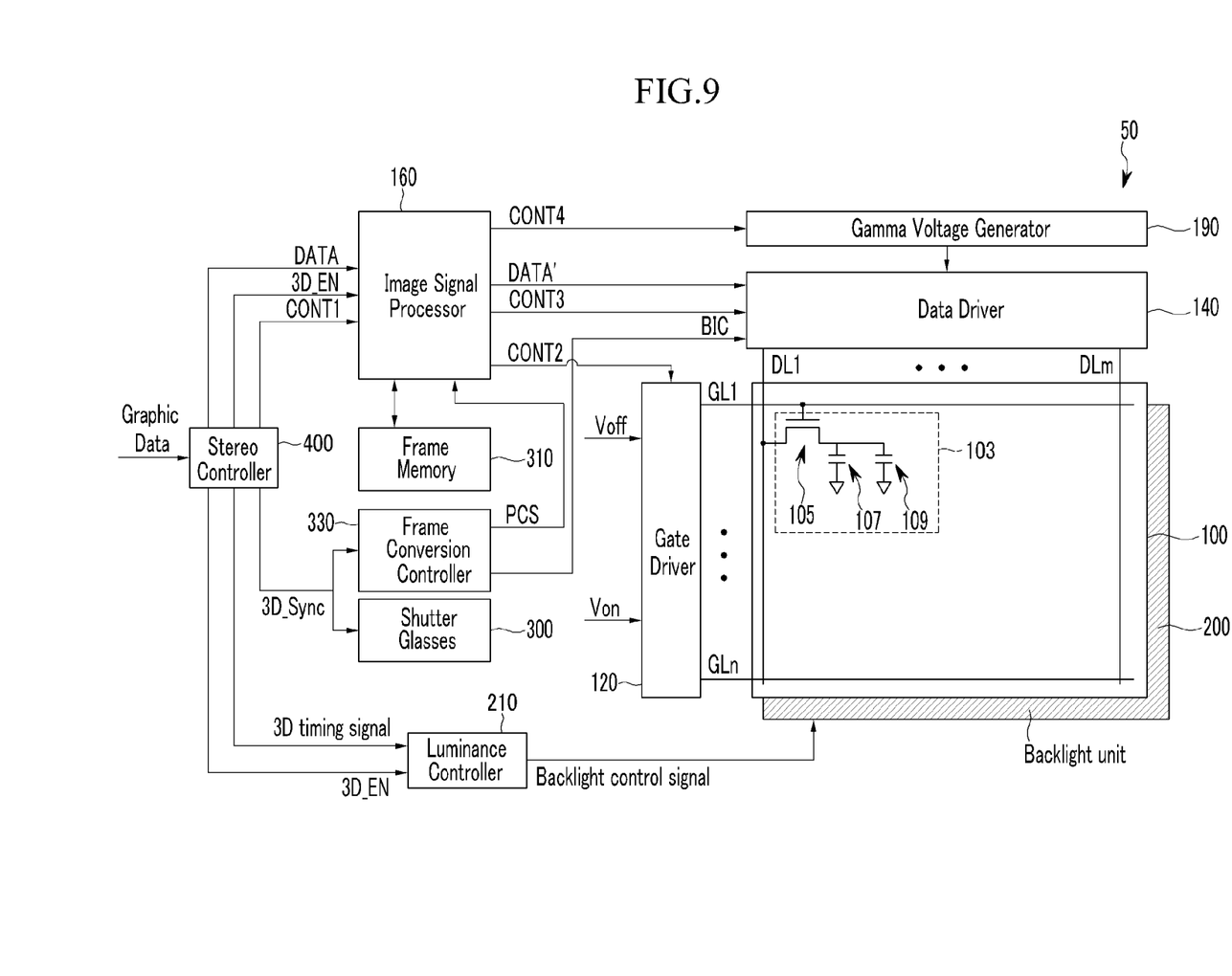
FIG. 9 is a schematic diagram showing an exemplary embodiment of an display apparatus which display a stereoscopic image according to an exemplary embodiment of the present invention.

FIG. 1 is a schematic diagram showing an exemplary embodiment of an operation of an exemplary embodiment of a stereoscopic image display device according to the present invention, FIG. 9 is a schematic diagram showing an exemplary embodiment of an display apparatus which display a stereoscopic image according to an exemplary embodiment of the present invention. FIG. 2 to FIG. 5 are graphs showing a signal waveform of the exemplary embodiment of a stereoscopic image display device of FIG. 1, FIG. 6 and FIG. 7 are graphs showing a current characteristic of a light-emitting diode ("LED"), and FIG. 8 is a block diagram of an LED driving method in a 2D mode and a 3D mode.

The display device 100 may include a liquid crystal display ("LCD"), an organic light emitting device or other similar display device. The following detailed description will describe an exemplary embodiment wherein the display device 100 is an LCD and will be described with reference to FIG. 1; however, alternative exemplary embodiments may include configurations wherein the display device 100 is another type of display device as described above.

The display device 100 may include an upper substrate, a lower substrate and a liquid crystal layer interposed between the upper substrate and the lower substrate. In the display device 100, the alignment direction of liquid crystal molecules in the liquid crystal layer is controlled by an electric field generated between two electrodes, and thereby the transmittance of light through the liquid crystal layer is controlled so as to display images.

In the present exemplary embodiment, the lower substrate includes a gate line (GL1, . . . GLn, in FIG. 9), a data line (DL1, . . . DLm, in FIG. 9), a pixel electrode and a thin film transistor (105 in FIG. 9) connected thereto. The thin film transistor (105 in FIG. 9) controls the voltage applied to the pixel electrode based on signals applied to the gate line and the data line. In one embodiment, the pixel electrode may be a transflective pixel electrode including a transmissive region and a reflective region. Also, exemplary embodiments include configurations wherein a storage capacitance capacitor (107 in FIG. 9) may be added, thereby maintaining the voltage applied to the pixel electrode for a predetermined time.

Exemplary embodiments include configurations wherein the upper substrate corresponding to the lower substrate may include a black matrix, a color filter and a common electrode. Also, alternative exemplary embodiments include configurations wherein at least one of the color filter, the black matrix, and the common electrode may be formed on the lower substrate, and in the exemplary embodiment wherein both the common electrode and the pixel electrode are formed in the lower substrate, at least one of the two electrodes may be a linear electrode.

The liquid crystal layer may include twisted nematic ("TN") mode liquid crystals, vertically aligned ("VA") mode liquid crystals, or electrically controlled birefringence ("ECB") mode liquid crystals.

Embodiments include configurations wherein polarizers are respectively attached on the outer surfaces of the upper substrate and the lower substrate. Also, embodiments include configurations wherein a compensation film may be added between the substrate and the polarizer.

The LCD display may include a backlight unit (200 in FIG. 9). The backlight unit (200 in FIG. 9) includes a light source, examples of which include a fluorescent lamp, such as a cold cathode fluorescent lamp ("CCFL"), and an LED, etc. Also, embodiments also include configurations wherein the backlight unit may additionally include a reflector, a light guide and a luminance improvement film.

FIG. 9 is a schematic diagram showing an exemplary embodiment of an display apparatus which display a stereoscopic image according to an exemplary embodiment of the present invention. Referring to FIG. 9, the display apparatus 50 includes display device 100, backlight 200, source driver 140, gate driver 120, image signal processor 160, gamma voltage generator 190, luminance controller 210, shutter glasses 300, stereo controller 400, and etc. The stereo controller 400 may transmit a 3D timing signal and 3D_EN (3D_enable) to the luminance controller 210. The luminance controller 210 may transmit a backlight control signal to the backlight unit 200. The backlight unit 200 may turn on or turn off by the backlight control signal through the luminance controller 210 and the stereo controller 400. Backlight control signals transmit to the backlight unit 200 will be explained below with FIG. 2 to FIG. 8.

The stereo controller may transmit 3D_sync signal to the shutter glasses 300. The shutter glasses may be electrically connected to the stereo controller 400 and the shutter glasses may receive the signal though infrared signal without wire. Shutter glasses may be operated in response to the 3D_sync or in response to a transformation of the 3D_sync. The 3D_sync may include signals which open or close the shutters. Shutter glasses control signal (3D_sync) which control the shutter glasses' open or close state will be explained below with FIG. 1 to FIG. 8.

The stereo controller may transmit the display DATA to the image signal processor. Image signal processor may transmit a various display data and a various control signal to the display device 100 through gate driver 120, data driver 140, a gamma voltage generator 190 or etc. to display image in display device 100. In 3D display the DATA to the image signal processor may include left-eye image and right eye image. Image data which is input to the display device 100 will be explained below with FIG. 1 to FIG. 8.

In FIG. 1, the stereoscopic image display device may include a shutter member 300. In one embodiment the shutter member 300 may be a glasses-type shutter member 300 as illustrated in FIG. 1, but the present invention is not limited to a glasses-type shutter member 300. For example, the shutter member 300 are formed with right-eye shutters 302 and 302' and left-eye shutters 301 and 301' to alternately block light with a predetermined time period in concert with, e.g., in coordination with, the display device 100. As described above, the right-eye shutter may be in a closed state 302 or in an open state 302' and the left-eye shutter may be in an open state 301 or in a closed state 301'. Both the right-eye shutter and the left-eye shutter may be in an open state. Both the right-eye shutter and the left-eye shutter may be in a closed state. The display device 100 may include an infrared emitting member (not shown) and the shutter member 300 may include an infrared receiving member (not shown) for receiving infrared signals from the infrared emitting member. The infrared emitting member and the infrared receiving member in communication with each other to drive the shutter member 300. In one embodiment, the shutter member 300 may include LCDs for each of the left-eye shutter and the right-eye shutter, but the present invention is not limited to the use of an LCD. For example, in one embodiment the shutter of the shutter member 300 includes two transparent conductive layers and a liquid crystal layer interposed therebetween, and a polarization film may be disposed on a surface of each conductive layer. An orientation of the liquid crystal material is controlled by a voltage applied to the shutter, and the shutter may be closed or opened by the orientation control of the liquid crystal material.

For example, when left-eye images, namely a quadrilateral 101 and a triangle 102 are output to the display device 100, the left-eye shutter 301 of the shutter member 300 is in the opened state such that the light is transmitted therethrough, and the right-eye shutter 302 is in the closed state such that the light is blocked thereby. Also, when right-eye images, namely a quadrilateral 101' and a triangle 102' are output to the display device 100, the right-eye shutter 302' of the shutter member 300 is in the opened state such that the light is transmitted therethrough, and the left-eye shutter 301' is in the closed state such that the light is blocked thereby. Accordingly, the left-eye image is perceived by the left eye during the predetermined time and then subsequently the right-eye image is perceived by the right eye, and as a result a stereoscopic image having depth is perceived by a viewer due to the difference between the left-eye image and the right-eye image.

The image recognized by the left eye is the image displayed at the N-th frame (F(N)), that is, the image in which the quadrangle 101 and the triangle 102 are separated from each other by the distance α. On the other hand, the image recognized by the right eye is the image displayed at the (N+1)-th frame (F(N+1)), that is, the image in which the quadrangle 101' and the triangle 102' are separated from each other by the distance β, which in the present embodiment is different than the distance α. As described above, when the separated distances between the images recognized by two eyes are different, a different distance perception is generated for the quadrilateral and the triangle such that it is perceived by the viewer that the triangle is separated behind the quadrangle, and thereby the viewer experiences depth perception. The depth perception in which two objects are separated from each other may be controlled by controlling the distances α and β at which the triangle 102 and the quadrilateral 101 are separated from each other.

Referring to FIG. 1, the arrow direction shown in the display device 100 represents the sequence through which the gate-on voltage is applied to the gate line (GL1 to GLn, in FIG. 9). That is, the gate-on voltage may be sequentially applied from the uppermost gate line of the display device 100 to the lowest gate line, e.g., the gate-on voltage is sequentially applied from a gate line corresponding to the top of the display through the gate lines to the gate line corresponding to the bottom of the display.

For example, the display device 100 may display the left-eye image 101 and 102 as described in more detail below. The gate-on voltage is sequentially applied to the gate lines such that the data voltage is applied to the pixel electrodes through the thin film transistors connected to the corresponding gate line. Here, the applied data voltage is a data voltage (hereinafter referred to as a left-eye data voltage) to represent the left-eye images 101 and 102, and the applied left-eye data voltage may be maintained during the predetermined time by the storage capacitance of the storage capacitor, where present. Also, a data voltage (hereinafter referred to as the right-eye data voltage) to represent the right-eye images 101' and 102' is applied through the same method, and may be maintained during the predetermined time by the storage capacitance of the storage capacitor, where present.

Figure 2:
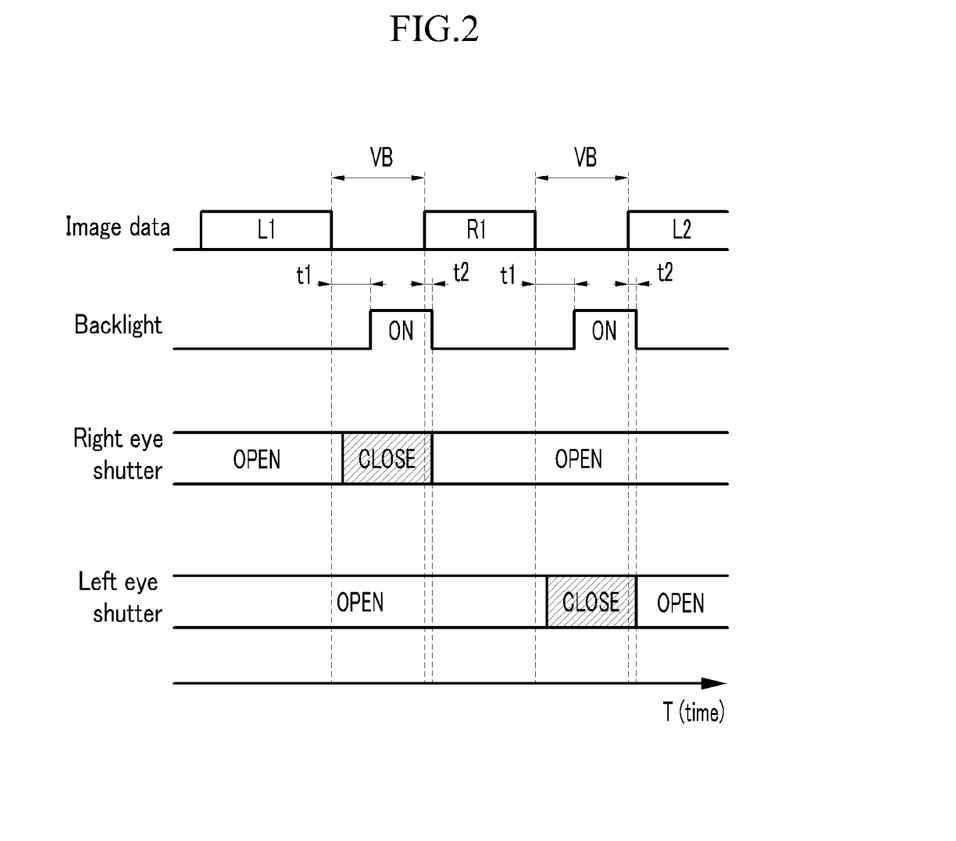
FIG. 2 to FIG. 5 are graphs showing a signal waveform of the exemplary embodiment of a stereoscopic image display device of FIG. 1 according to the present invention.

Referring to FIG. 2, the left-eye image data L1, L2, . . . and the right-eye image data R1, . . . are alternately input to the display device 100; as used herein the term "input to the display device 100" refers to a time period during which the gate ON signals are applied to the gate lines of the display, i.e., a vertical period, and the data voltages corresponding to the sequential gate lines are applied to the corresponding pixel electrodes. Thus, the left-eye image data and the right eye image data may actually be input to the display 100. In L1 input period a left-eye image data is drawn (scanned) in the display device 100, and then, in a vertical blanking time there is no data input to the display device. In R1 input period a right-eye image data is drawn (scanned) in the display device 100, and then, in a vertical blanking time there is no data input to the display device. A frame may include a data input period and vertical blanking period.

Here, the image data means data represented as a digital type to output the image to the display device 100. As illustrated in FIG. 2, there is a time during which the image data is not input. The time period during which the image data is not input occurs before the right-eye image data is input but after the left-eye image data is input. The time period during which the image data is not input also occurs before the left-eye image data is input but after the right-eye image data is input. The time period during which the image data is not input is referred to as a vertical blanking ("VB") time. During at least a part of the time within a VB time, one of the left-eye shutters 301 and 301' and the right-eye shutters 302 and 302' is changed to a closed state CLOSE, and the other maintains the opened state OPEN. Also, the left-eye shutters 301 and 301' and the right-eye shutters 302 and 302' of the shutter member 300 all are opened during at least a part of the time when the left-eye image data or the right-eye image data is being input. When image data L1 is input to the display device 100, left-eye shutter and right eye shutter are in an open state. In a vertical blanking (VB) time followed by the L1 period, right-eye shutter is in a closed state and left-eye shutter is in an open state. When image data R1 is input to the display device 100, left-eye shutter and right-eye shutter are in an open state. In a vertical blanking (VB) time followed by the R1 period, right-eye shutter is in an open state and left-eye shutter is in a close state. Accordingly, when the viewer wears the shutter member 300 and views the display device, the luminance near the display device 100 may be increased, the display device 100 may itself be bright, the tiredness of the eye may be reduced even when the viewer watches the display device with the shutter member for a long time, and the flicker generated by the external light source may be reduced due to the shorter period where the image is blocked by a closed eye shutter. For example, when the viewer wears the exemplary embodiment of a shutter member 300 according to the present invention, the luminance near the display device 100 is about 162 nit compared to a comparative display device which has a brightness of about 13.5 nit as described below.

In contrast, according to the conventional art in which the left-eye shutter and the right-eye shutter are closed when the right-eye image data or the left-eye image data is input, respectively, the luminance near the display device is reduced, the display device itself may be dark, the flicker generated by the external light source may be easily recognized, and the tiredness of the eyes may be serious when watching for an extended time period. For example, when the viewer wears the shutter member according to the conventional art, the luminance of the display device is only about 13.5 nit as mentioned above.

In an exemplary embodiment of the present invention, the backlight is turned on during at least a part of time among the VB, and is turned off during most of the time when the left-eye image data or the right-eye image data is input, and accordingly the power consumption of the display device 100 may be reduced. As shown in FIG. 2, the backlight may remain turned on during a brief time period where the subsequent image data is being inputted, e.g., time period t2 to be described in more detail below.

For example, after the left-eye image data L1 is input to the display device 100, the opened right-eye shutter 302 is changed to the closed state, the opened left-eye shutter 301 maintains the opened state and the backlight is turned on, and thereby the left-eye image, including the quadrilateral 101 and the triangle 102, output to the display device 100 is shown through the left-eye shutter 301 and perceived by a viewer. Also, when the right-eye image data R1 is started to be input to the display device 100, the closed right-eye shutter 302 is opened (albeit after a small delay corresponding to the time period t2), and the left-eye shutter 301 maintains the opened state. Next, after the right-eye image data R1 is entirely input to the display device 100, the opened left-eye shutter 301 is changed to the closed state, the opened right-eye shutter 302' maintains the opened state and the backlight unit is turned on, and thereby the right-eye image, including the quadrilateral 101' and the triangle 102', output to the display device 100 are shown through the right-eye shutter 302'.

Also, the backlight may be turned on after a predetermined time t1 after the time when the input of the left-eye image data or the right-eye image data is completed. The time t1 may be a sufficient time for the left-eye shutter or the right-eye shutter to be completely closed. That is, when considering the response time of the liquid crystal molecules inside the shutter, the shutter may be previously applied with the voltage before the backlight is turned on during the VB period. Accordingly, the image is shown through the shutter of the other side after the shutter of one side is completely closed such that cross-talk in which the left-eye image and the right-eye image are overlapped may be substantially reduced or effectively prevented. Also, the response time of the liquid crystal molecules inside the shutter is changed by the influence of the ambient temperature and the application voltage such that the time t1 may be automatically or manually controlled when the response time of the liquid crystal becomes slower or faster. For example, when the response time of the liquid crystal becomes slow, e.g., due to use in low temperatures, the time t1 may be a sufficient time for the left-eye shutter or the right-eye shutter to be completely closed.

On the other hand, if the time t1 is increased, the time when the backlight is turned on is shortened such that the luminance of the display device 100 may be reduced, and accordingly the cross-talk and the luminance of the display device have a trade-off relationship according to the size of the time t1. Accordingly, the time t1 may be controlled to increase the luminance of the display device while reducing the perceived cross-talk. For example, the time t1 may be larger than the closing time of the shutter liquid crystal and may be smaller than the entire VB period. In an exemplary embodiment wherein the shutter liquid crystal is the TN mode liquid crystal, the falling time (corresponding to the closing time) of the liquid crystal is about 0.3 ms and the VB is about 2.65 ms, and the time t1 may be larger than about 0.3 ms and less than about 2.65 ms. Furthermore, exemplary embodiments include configurations wherein the time t1 may be larger than 0.5 ms and less than 2.0 ms.

Also, after the left-eye image data or the right-eye image data is started to be input, when considering the response time of the liquid crystal of the display device 100, the backlight may maintain the opened state during the time t2. There is a relationship wherein the luminance of the display device 100 is increased as the time when the backlight is turned on is increased such that the luminance of the display device 100 may be increased when the time t2 is larger than 0 ms. Also, in some exemplary embodiments, the response speed of the liquid crystal of the display device 100 is slow during the initial time when the left-eye image data or the right-eye image data is started to be input such that the cross-talk may not be generated although the backlight is turned on. Further, the response time of the liquid crystal inside the display device 100 is changed by the influence of the ambient temperature and the application voltage such that the time t2 may be automatically or manually controlled when the response time of the liquid crystal become slower or faster.

In one exemplary embodiment, the time t2 may be 0 ms. In such an exemplary embodiment, the backlight is changed to the off state at the moment that the left-eye image data or the right-eye image data is input. On the other hand, the cross-talk and the luminance of the display device have a trade-off relationship according to the size of the time t2. Accordingly, the time t2 may be controlled to increase the luminance of the display device while reducing the cross-talk. For example, in one embodiment the time t2 may be more than 0, and may be less than about 15% of the rising time of the liquid crystal of the display device. When the liquid crystal of the display device is the TN mode liquid crystal and the rising time of the liquid crystal is about 3.96 ms, the time t2 may be more than 0 and less than about 0.6 ms. Furthermore, in one exemplary embodiment the time t2 may be more than 0.1 ms and less than 0.5 ms.

The time when the closed shutter is changed to the opened state may be substantially the same as the time when the backlight is turned-off, and accordingly the cross-talk may be prevented. For example, in one exemplary embodiment when the backlight maintains the turned-on state during the time t2 after the left-eye image data or the right-eye image data is input, the shutter is changed from the closed state to the opened state at the time when the backlight is turned off. Also, when the backlight is turned off at the time when the left-eye image data or the right-eye image data is started to be input, the shutter is changed from the closed state to the opened state at the time when the backlight is turned off.

When considering the response speed of the shutter liquid crystal, the time when the closed shutter is changed to the opened state may be before the time when the left-eye image data or the right-eye image data is input. Accordingly, the time when the shutter is opened is further increased such that the luminance near the display device 100 may be increased. The time difference between the time when the closed shutter is changed to the opened and when the left-eye image data or the right-eye image data is input is less than the response speed of the shutter liquid crystal, and is a short time in which the right-eye is not capable of recognizing the left-eye image and thus cross-talk may be reduced or effectively prevented.

Figure 3:
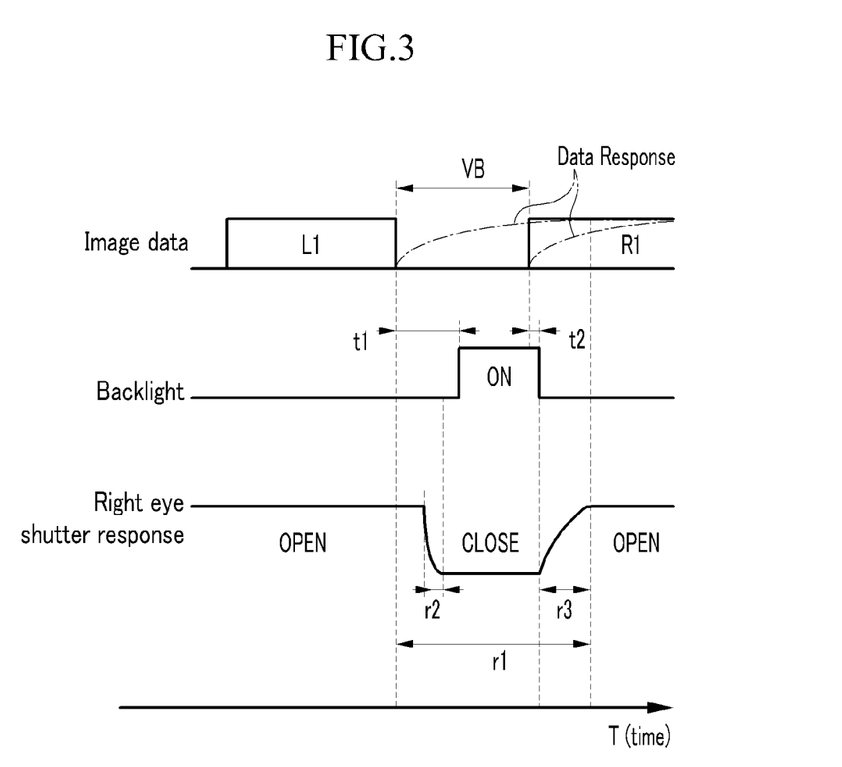

Referring to FIG. 3, the response time of the liquid crystal of the display device 100 and the response time of the liquid crystal of the shutter member 300 are exemplarily shown. The data response of the liquid crystal for the left-eye image data L1 input to the pixel row of the lower portion of the display device 100 and the data response of the liquid crystal for the right-eye image data R1 input to the pixel row of the upper portion of the display device 100 (both illustrated as dotted lines extending from the respective image data waveforms) may be slower than the response of the liquid crystal of the shutter member 300. For example, the response time r1 of the display device 100 may be about 4 ms, the rising (closing) time r2 of the liquid crystal of the shutter member 300 may be about 0.3 ms, the falling time r3 (corresponding to the opening time) of the liquid crystal of the shutter member 300 may be about 1.38 ms, and in such an exemplary embodiment, the VB period may be about 2.65 ms. If the response of the liquid crystal of the shutter member 300 is the high level, the shutter is in the opened state OPEN, if it is the low level, the shutter is in the closed state CLOSE. The closing (rising) time r2 of the liquid crystal of the shutter member 300 may be positioned in the time t1 where the backlight is not turned on. The starting position of the rising time r3 of the liquid crystal of the shutter member 300 may substantially accord to when the backlight is changed into the off state.

Figure 4:
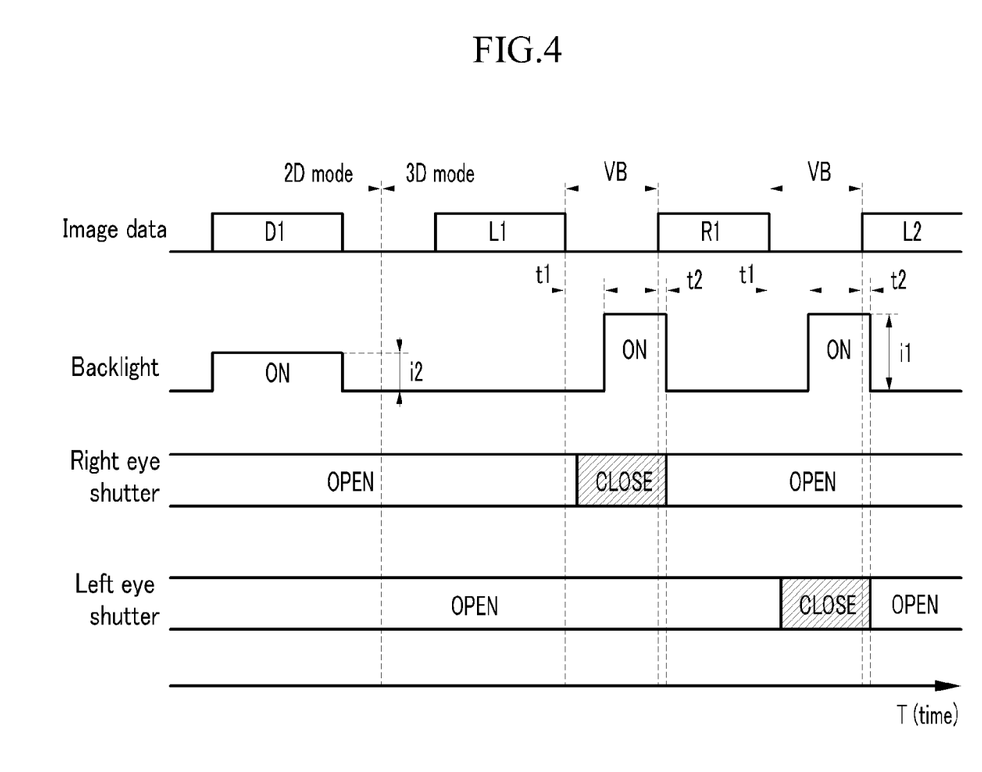
Figure 5:
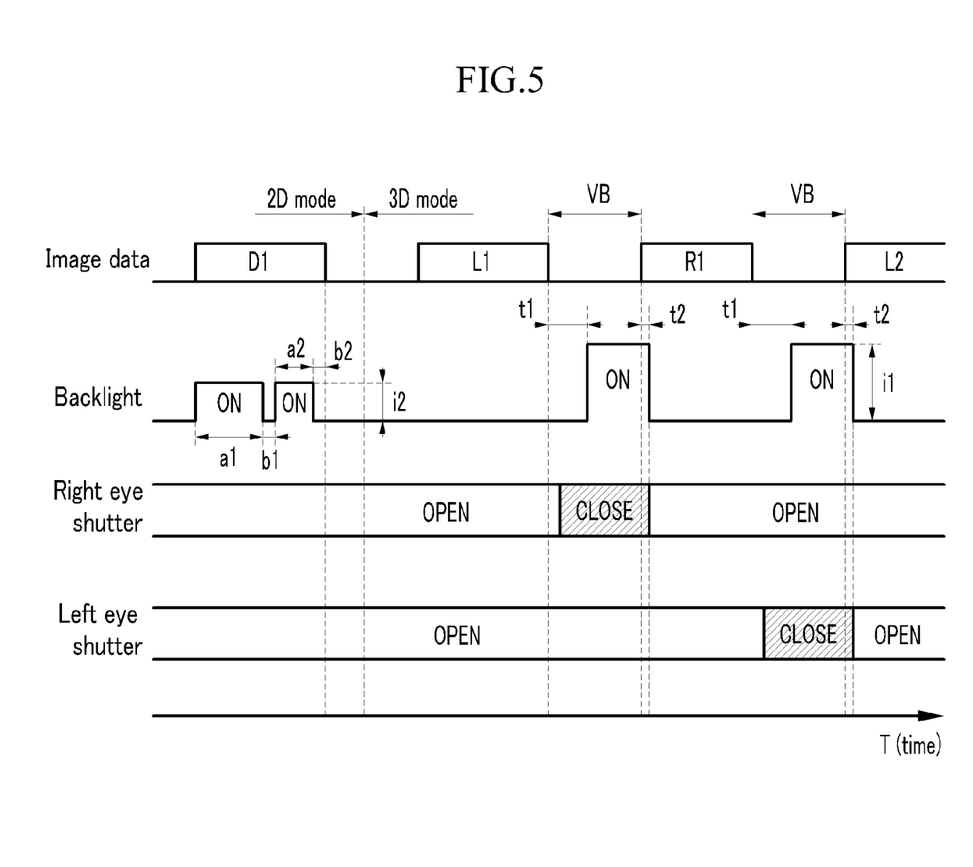

Referring to FIG. 4, in one exemplary embodiment the luminance of the backlight in the 3D mode may be higher than the luminance of the backlight in the 2D mode. That is, the luminance when the backlight in the 3D mode is in the ON state may be higher than the luminance when the backlight in the 2D mode is in the ON state. Driving the backlight by controlling the magnitude of the voltage applied thereto at the special period corresponding to the 3D mode ON state is referred to as impulsive driving. Accordingly, the luminance of the display device 100 in the 3D mode may be increased. One method for impulse driving includes having the magnitude i1 of the ON pulse of the backlight in the 3D mode be larger than the magnitude i2 of the ON pulse of the backlight of the 2D mode. For example, the magnitude i1 of the ON pulse of the backlight in the 3D mode may be larger than the magnitude i2 of the ON pulse of the backlight of the 2D mode in the range of about 1.5 to about 2 times or more. For example, in one exemplary embodiment the backlight may be driven by applying a current of about 20 mA in the 2D mode and the backlight may be driven by applying a current of about 30-40 mA in the 3D mode.

The 2D mode may be a state in which the shutter member is not worn (such a situation is similar to the state in which the left-eye shutter and the right-eye shutter are always opened), and the backlight may be continuously turned on during the time when the image data D1 is input (a duty ratio may be about 100%). Also, referring to FIG. 5, the duty ratio of the backlight in the 2D mode may be controlled by pulse width modulation ("PWM"), and in such an exemplary embodiment the time when the backlight is turned on is decreased such that the power consumption may be reduced. For example, in one exemplary embodiment when the duty where the backlight is continuously turned on with the direct current ("DC") type voltage is 100%, the duty ratio ((a1+a2)/(a1+a2+b1+b2)) may be less than about 100%, and in one exemplary embodiment may be about 50%. In another exemplary embodiment the duty ratio may be about 30%. Here, a1 and a2 refer to the time period when the backlight is applied with the voltage, and b1 and b2 refer to the time when the backlight is not applied with the voltage.

FIG. 6 and FIG. 7 are graphs showing a characteristic of a current ON/OFF of the LED of the backlight. The LED has a very high current response speed such that the current response speed may be represented as a nanosecond unit under the conversion from the ON state to the OFF state (or from the OFF state to the ON state). The interval of one line of the time axis of FIG. 6 is about 20 ns, and the line interval of the current axis is about 1 V. The interval of one line of the time axis of FIG. 7 is about 40 ns, and the line interval of the current axis is about 1 V.

Referring to FIG. 6, the time when the LED of the OFF state reaches the ON state by applying the voltage may be about 32.4 ns. It may be confirmed that this response speed of the LED is very fast compared with the response speed of the liquid crystal having a millisecond unit of time measurement, e.g., the LED responds on the nanosecond time scale whereas the liquid crystal has a response speed on the millisecond time scale. FIG. 7 shows the time when the LED of the ON state is changed to the OFF state. As shown in FIG. 7, the time when the LED of the ON state is changed into the OFF state is about 99.2 ns. It may be confirmed that this response speed of the LED is very fast compared with the response speed of the liquid crystal having a millisecond unit.

If the light source, such as the LED having the faster current response speed than a CCFL, is used as the backlight of the display device 100, the impulsive driving of the backlight may be speedily executed. Also, the power consumption of the LED is less than that of the CCFL.

FIG. 8 is a block diagram of a LED driving method in the 2D mode and the 3D mode. If the image is input to the display device 100, a mode detector determines whether the input image is 2D image data or 3D image data. For example, the 3D image data may include the left-eye image data and the right-eye image data (here, the 3D image means the stereoscopic image having the depth perception through the difference between the left-eye image and the right-eye image as discussed at length above), and the 2D image data may mean normal image data that is not the left-eye image data or the right-eye image data. When the input image is the 2D image data, the LED used as the backlight of the display device 100 may be driven by the pulse modulation method, and thereby the power consumption may be reduced. For example, when the duty ratio of the LED is about 100% and a voltage of about 12 V is applied, the power consumption is about 4.23 W, when the duty ratio of the LED is about 50% and the voltage of about 12 V is applied, the power consumption is about 2.20 W, and when the duty ratio of the LED is about 30% and the voltage of about 12 V is applied, the power consumption is about 1.57 W.

When the input image is the 3D image data, the LED used as the backlight of the display device 100 may be driven by the impulsive method as described above, and an LED impulsive signal is made with reference to the signal such as a scanning start signal such that the LED may be turned on at a predetermined time.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A stereoscopic image display device comprising:
   a display device including pixels displaying an image, wherein a left-eye image data and a right-eye image data are alternately input to the pixels, and a blank period inserted between a first data input period of the left-eye image data and a second data input period of the right-eye image data that are adjacent to each other;
   a shutter member comprising a left-eye shutter and a right-eye shutter; and
   a backlight which provides light toward the display device,
   wherein the left-eye shutter and the right-eye shutter are opened during at least one of the first data input period and the second data input period,
   wherein the backlight starts to turn on at a time when a first time which is greater than 0 and less than the blank period passes from a time when the first data input period or the second data input period finishes,
   wherein the left-eye shutter starts to close after the second data input period finishes and before the first time passes from the time when the second data input period finishes, and the right-eye shutter starts to close after the first data input period finishes and before the first time passes from the time when the first data input period finishes, and
   wherein a responding time to complete closing of the left-eye shutter or the right-eye shutter is less than the first time.

2. The stereoscopic image display device of claim 1, wherein
   the backlight receives a first on pulse, and
   at least a part of the first on pulse occurs between the input period of the left-eye image data and the input period of the right-eye image data.

3. The stereoscopic image display device of claim 2, wherein the display device receives normal image data, and
   the backlight comprises at least one second on pulse which occurs at the input period of the normal image data, and the magnitude of the first on pulse is larger than the magnitude of the second on pulse.

4. The stereoscopic image display device of claim 3, wherein the backlight includes a light emitting diode.

5. The stereoscopic image display device of claim 3, wherein a magnitude of the first on pulse is equal to or larger than about 1.5 times a magnitude of the second on pulse.

6. The stereoscopic image display device of claim 3, wherein the second on pulse has a duty ratio of less than about 100%.

7. The stereoscopic image display device of claim 2, wherein one of the left-eye shutter and the right-eye shutter is closed and the other of the left-eye shutter and the right-eye shutter is opened in at least a part of the first on pulse.

8. The stereoscopic image display device of claim 2, wherein the left-eye shutter and the right-eye shutter respectively further comprise a liquid crystal material, and
   the first time period is greater than a response time of a liquid crystal material of either of the left-eye shutter and the right-eye shutter.

9. The stereoscopic image display device of claim 2, wherein the backlight is turned off after the passage of a second time period measured from the start of the input of the left-eye image data or the right-eye image data.

10. The stereoscopic image display device of claim 9, wherein the display device further comprises a liquid crystal material, and
    the second time period is shorter than a response time of a liquid crystal material of the display device.

11. The stereoscopic image display device of claim 10, wherein the second time period is less than about 15% of the response time of the liquid crystal material of the display device.

12. The stereoscopic image display device of claim 9, wherein the right-eye shutter is opened after the passage of the second time period from the time when the input of the right-eye image data is started, and the left-eye shutter is opened after the passage of the second time period from the time when the input of the left-eye image data is started.

13. The stereoscopic image display device of claim 12, wherein the right-eye shutter is opened before a third time from the time when the input of the right-eye image data is started, and the left-eye shutter is opened before the third time from the time when the input of the left-eye image data is started.

14. The stereoscopic image display device of claim 2, wherein the backlight is turned off after the passage of a second time period measured from the time when the input of one of the left-eye image data and the right-eye image data is started.

15. The stereoscopic image display device of claim 14, wherein the right-eye shutter is opened after the passage of the second time period from the time when the input of the right-eye image data is started, and the left-eye shutter is opened after the passage of the second time period from the time when the input of the left-eye image data is started.

16. A stereoscopic image display device comprising:
    a display device including pixels displaying an image, wherein a left-eye image data and a right-eye image data are alternately input to the pixels, and a blank period inserted between a first data input period of the left-eye image data and a second data input period of the right-eye image data that are adjacent to each other;
    a backlight which receives a first on pulse and at least one second on pulse; and
    a shutter member comprising a left-eye shutter and a right-eye shutter,
    wherein at least a part of the first on pulse occurs between the first data input period and the second data input period, the second on pulse occurs during an input period of a normal image data, and a magnitude of the first on pulse is larger than a magnitude of the second on pulse,
    wherein the backlight starts to turn on at a time when a first time which is greater than 0 and less than the blank period passes from a time when the first data input period or the second data input period finishes,
    wherein the left-eye shutter starts to close after the second data input period finishes and before the first time passes from the time when the second data input period finishes, and the right-eye shutter starts to close after the first data input period finishes and before the first time passes from the time when the first data input period finishes, and
    wherein a responding time to complete closing of the left-eye shutter or the right-eye shutter is less than the first time.

17. The stereoscopic image display device of claim 16, wherein the backlight includes a light emitting diode.

18. The stereoscopic image display device of claim 16, wherein the magnitude of the first on pulse is equal to or larger than about 1.5 times the magnitude of the second on pulse.

19. The stereoscopic image display device of claim 16, wherein the second on pulse has a duty ratio of less than about 100%.

20. The stereoscopic image display device of claim 16, wherein one of the left-eye shutter and the right-eye shutter is closed and the other of the left-eye shutter and the right-eye shutter is opened in at least a part of a period of the first on pulse.

21. The stereoscopic image display device of claim 16, wherein the left-eye shutter and the right-eye shutter respectively further comprise a liquid crystal material, and the first time period is longer than a response time of the liquid crystal material of the left-eye shutter or the right-eye shutter.

22. The stereoscopic image display device of claim 16, wherein the backlight is turned off after the passage of a second time period from the start of the input of the left-eye image data or the start of the input of the right-eye image data.

23. The stereoscopic image display device of claim 22, wherein the display device further comprises a liquid crystal material, and the second time period is shorter than a response time of the liquid crystal material of the display device.

24. The stereoscopic image display device of claim 23, wherein the second time period is less than about 15% of the response time of the liquid crystal material of the display device.

25. The stereoscopic image display device of claim 22, wherein the right-eye shutter is opened after passage of the second time period from the time when the input of the right-eye image data is started, and the left-eye shutter is opened after passage of the second time period from the time when the input of the left-eye image data is started.

26. The stereoscopic image display device of claim 25, wherein the right-eye shutter is opened before a third time from the time when the input of the right-eye image data is started, and the left-eye shutter is opened before the third time from the time when the input of the left-eye image data is started.

27. The stereoscopic image display device of claim 16, wherein the backlight is turned off after the passage of the second time period from the time when the input of the left-eye image data or the input of the right-eye image data is started.

28. The stereoscopic image display device of claim 27, wherein the right-eye shutter is opened after passage of the second time period from the time when the input of the right-eye image data is started, and the left-eye shutter is opened after passage of the second time period from the time when the input of the left-eye image data is started.

29. A method for driving a stereoscopic image display device comprising a display device including pixels displaying an image and a shutter member which comprises a left-eye shutter and a right-eye shutter and disposed between the display device and an observer, the method comprising:

alternately inputting left-eye image data and right-eye image data to the pixels, a blank period inserted between a first data input period of the left-eye image data and a second data input period of the right-eye image data that are adjacent to each other; and opening the left-eye shutter and the right-eye shutter during at least a part of the first data input period or the second data input period, wherein a backlight starts to turn on at a time when a first time which is greater than 0 and less than the blank period passes from a time when the first data input period or the second data input period finishes, wherein the left-eye shutter starts to close after the second data input period finishes and before the first time passes from the time when the second data input period finishes, and the right-eye shutter starts to close after the first data input period finishes and before the first time passes from the time when the first data input period finishes, and wherein a responding time to complete closing of the left-eye shutter or the right-eye shutter is less than the first time.

30. The method of claim 29, wherein at least a part of a first on pulse is applied to the backlight between an input period of the left-eye image data and an input period of the right-eye image data.

31. The method of claim 30, wherein the display device is input with normal image data, at least one second on pulse is applied to the backlight during an input period of the normal image data, and a magnitude of the first on pulse is equal to or larger than about 1.5 times a magnitude of the second on pulse, the left-eye shutter starts to close after the input of the right-eye image data is completed and before the first time passes from the time that the input of the right-eye image data is completed, and the right-eye shutter starts to close after the input of the left-eye image data is completed and before the first time passes from the time that the input of the left-eye image data is completed, and a closing time of the left-eye shutter or the right-eye shutter is within the first time.

32. The method of claim 31, wherein the backlight includes a light-emitting diode.

33. The method of claim 30, wherein one of the left-eye shutter and the right-eye shutter is closed and the other of the left-eye shutter and the right-eye shutter maintains an opened state in at least a part of the period of the first on pulse.

34. The method of claim 30, wherein the backlight is turned off after passage of a second time period from the start of one of the input period of the left-eye image data and the input period of the right-eye image data.

35. A method for driving a stereoscopic image display device comprising a display device including pixels displaying an image and a shutter member comprising a left-eye shutter and a right-eye shutter, the method comprising:

inputting normal image data to the pixels;

alternately inputting a left-eye image data and a right-eye image data to the pixels, a blank period inserted between a first data input period of the left-eye image data and a second data input period of the right-eye image data that are adjacent to each other;

applying at least a part of a first on pulse to a backlight between the first data input period and the second data input period; and applying at least one second on pulse to the backlight during an input period of the normal image data, wherein a magnitude of the first on pulse is larger than a magnitude of the second on pulse, the backlight starts to turn on at a time when a first time which is greater than 0 and less than the blank period passes from a time when the first data input period or the second data input period finishes, the left-eye shutter starts to close after the second data input period finishes and before the first time passes from the time when the second data input period finishes, and the right-eye shutter starts to close after the first data input period finishes and before the first time passes from the time when the first data input period finishes, and a responding time to complete closing of the left-eye shutter or the right-eye shutter is less than the first time.

36. The method of claim 35, wherein the backlight includes a light-emitting diode.

37. The method of claim 35, wherein one of the left-eye shutter and the right-eye shutter is closed and the other of the left-eye shutter and the right-eye shutter is opened in at least a part of the period of the first on pulse.

38. The method of claim 35, wherein the backlight is turned off after the passage of a second time period from a start of the input of one of the left-eye image data and the right-eye image data.

39. A stereoscopic image display device comprising:
a display device including pixels—into which a left-eye image data and a right-eye image data are alternately input, a blank period inserted between a first data input period of the left-eye image data and a second data input period of the right-eye image data that are adjacent to each other;
a shutter member comprising a left-eye shutter and a right-eye shutter; and
a backlight which emits light to the display device,
wherein both the left-eye shutter and the right-eye shutter are in an open state during a charging period during which data voltages corresponding to one of the left-eye image data and the right-eye image data are charged into the pixels,
one of the left-eye shutter and the right-eye shutter are in a closed state after the charging period corresponding to charging of one of the left-eye image data and the right-eye image data,
the backlight emits light to the display device only when one of the left-eye shutter and the right-eye shutter are in a closed state,
the backlight starts to turn on at a time when a first time which is greater than 0 and less than the blank period passes from a time when the first data input period or the second data input period finishes,
the left-eye shutter starts to close after the second data input period finishes and before the first time passes from the time when the second data input period finishes, and the right-eye shutter starts to close after the first data input period finishes and before the first time passes from the time when the first data input period finishes, and
a responding time to complete closing of the left-eye shutter or the right-eye shutter is less than the first time.

40. A stereoscopic image display device comprising:
a display device including pixels into which a left-eye image data and a right-eye image data are alternately input, a blank period inserted between a first data input period of the left-eye image data and a second data input period of the right-eye image data that are adjacent to each other, wherein the display device comprises:
a display panel including the pixels; and
a backlight which lights the display panel;
wherein the backlight is in an on-state during the blank period and is in an off-state during a remaining period,
the backlight starts to turn on at a time when a first time which is greater than 0 and less than the blank period passes from a time when the first data input period or the second data input period finishes,
the left-eye shutter starts to close after the second data input period finishes and before the first time passes from the time when the second data input period finishes, and the right-eye shutter starts to close after the first data input period finishes and before the first time passes from the time when the first data input period finishes, and
a responding time to complete closing of the left-eye shutter or the right-eye shutter is less than the first time.

* * * * *